United States Patent [19]

Warren et al.

[11] Patent Number: 4,622,903
[45] Date of Patent: Nov. 18, 1986

[54] SEWAGE SCREENINGS DISPOSAL SYSTEM

[75] Inventors: William C. Warren, Doncaster; Arpad Futo, Ferny Creek, both of Australia

[73] Assignee: Warren Engineering Pty. Ltd., Glen Waverley, Australia

[21] Appl. No.: 621,929

[22] PCT Filed: Nov. 4, 1983

[86] PCT No.: PCT/AU83/00160
§ 371 Date: Jun. 14, 1984
§ 102(e) Date: Jun. 14, 1984

[87] PCT Pub. No.: WO84/01941
PCT Pub. Date: May 24, 1984

[30] Foreign Application Priority Data

Nov. 18, 1982 [AU] Australia ............... PF6873

[51] Int. Cl.<sup>4</sup> ................................ F23G 5/04
[52] U.S. Cl. ................. 110/221; 110/165 R; 110/254; 110/255; 34/189
[58] Field of Search ............ 110/223, 254, 255, 259, 110/346, 101 R; 34/189

[56] References Cited

U.S. PATENT DOCUMENTS

| 2,249,960 | 7/1941 | Jones | 34/189 |
| 2,269,273 | 1/1942 | Krogh et al. | 110/228 |
| 3,570,421 | 3/1971 | Howers, Jr. | 110/255 |
| 3,722,433 | 5/1973 | Kramer | 110/255 |
| 3,841,242 | 12/1974 | Sigg | 110/165 R |
| 3,855,950 | 12/1974 | Hughes, Jr. et al. | 110/165 R |
| 3,941,065 | 3/1976 | Albrecht | 110/254 |
| 3,995,568 | 12/1976 | Dvirka et al. | 110/101 C |
| 4,109,590 | 8/1978 | Mansfield | 110/254 |
| 4,185,567 | 1/1980 | Grossniklaus | 110/101 R |
| 4,358,170 | 11/1982 | Eberele et al. | 34/189 |

Primary Examiner—Henry C. Yuen
Attorney, Agent, or Firm—Balogh, Osann, Kramer, Dvorak, Genova & Traub

[57] ABSTRACT

A sewage screenings disposal system where raw screenings are fed to a dewatering press (7) for reducing the moisture content of the screenings, slugs of pressed screenings are conveyed from the dewatering press (7) to a multi-compartment storage carousel (17), loader ram means (16) charge the slugs into empty carousel compartments (21) and feeder ram means (26) located remote from the loader arm ram means (16) push the slugs from the full carousel compartments (21) into an incinerator (29). The carousel drive means are connected through a compartment indexing mechanism and carousel locking means (22) whereby during loading or feeding the carousel is locked against rotation.

18 Claims, 8 Drawing Figures

SEWAGE SCREENINGS DISPOSAL SYSTEM

BACKGROUND OF THE INVENTION

This invention relates to a sewage screenings disposal system which takes raw screenings such as paper, cloth and plastic based materials as supplied from sewage bar screens, reduces the moisture content by pressing and allows disposal by incineration with a minimum of auxiliary fuel, provides storage of the pressed screenings and ultimate reduction of the screenings to an inert inactive material suitable for disposal by landfill, and at the same time substantially reduces the screenings by up to 98% in both weight and volume. It is generally accepted that raw screenings have a moisture content of approximately 85%-90% and a density of approximately 870 Kg/m$^3$.

SUMMARY OF THE INVENTION

According to the present invention the screenings disposal system comprises, dewatering press means for reducing the moisture content of the raw screenings, loader means for loading slugs of pressed screenings from the dewatering press means into a storage carousel, feeder means for feeding the slugs of pressed screenings from the carousel into an incinerator, and means for removing the resultant ash from the incinerator.

A conveyor means may be provided to carry raw screenings from a conventional bar screening means to a loading hopper on the dewatering press means.

The incinerator may include a rocking type agitating grate system incorporating a grate obstruction control system.

The plant may be manually controlled or be fully automatic under a programmable logic control.

DESCRIPTION OF EMBODIMENT

In order that the invention and its manner of performance will be more fully understood, reference will now be made to an embodiment of the invention as illustrated in the accompanying drawings, in which.

Referring to the drawings, a conveyor 5 receives raw screenings from a conventional bar screen (not shown) and delivers the screenings into a hopper 6 mounted on a dewatering press 7. Hopper 6 may be provided with a hinged side section to allow loading of the hopper with bagged raw screenings from other screening plants.

The dewatering press 7 includes a hydraulically operated pressure gate 8 and a hydraulically operated dewatering press ram 9. Side plates 10 of press 7 are provided with a series of apertures 11 to allow removal of liquid from the screenings being pressed. This liquid falls into a chamber or gutter 12 from which it is drained back into the sewage plant.

Sprays 13 are activated when the ram 9 is moving inwardly during the pressing cycle to allow flushing water to pass over the outside of the dewatering area of apertured side plates 10 of press 7, and sprays 14 are activated when ram 9 is moving outwardly after a pressing operation to cleanse the pressed material in the press chamber.

Figure 1:
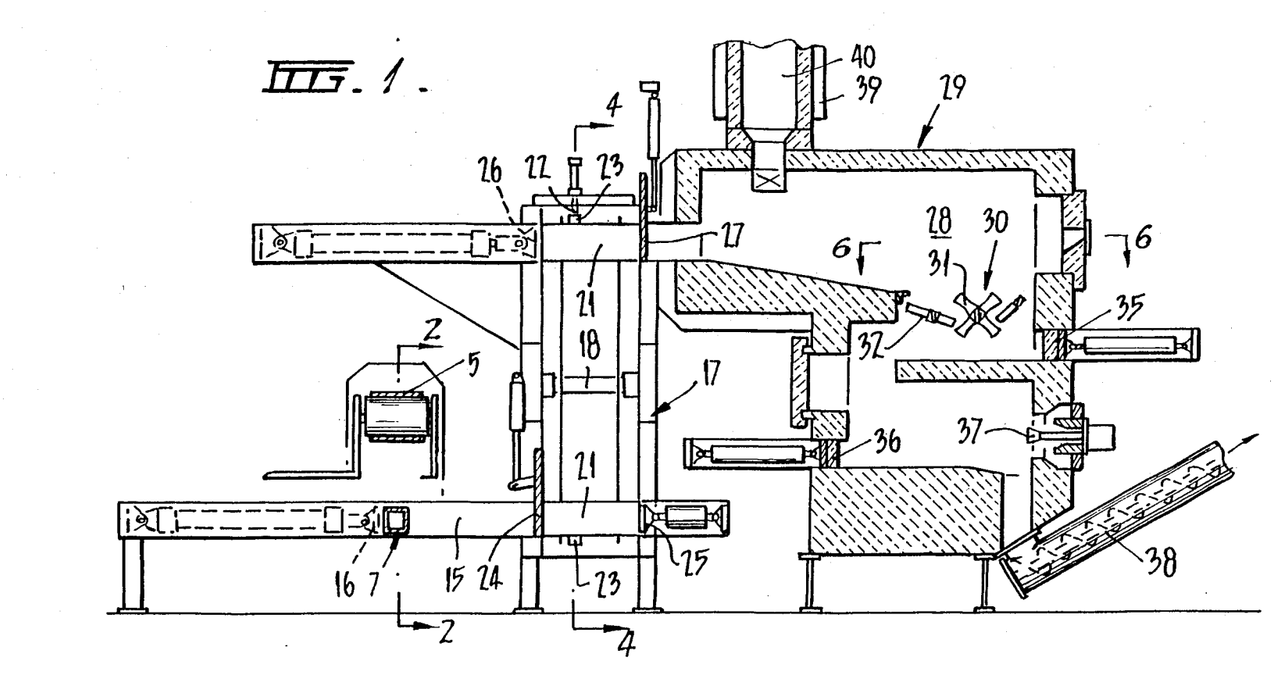
FIG. 1 is a sectional side elevation through the apparatus.
Figures 2, 3:
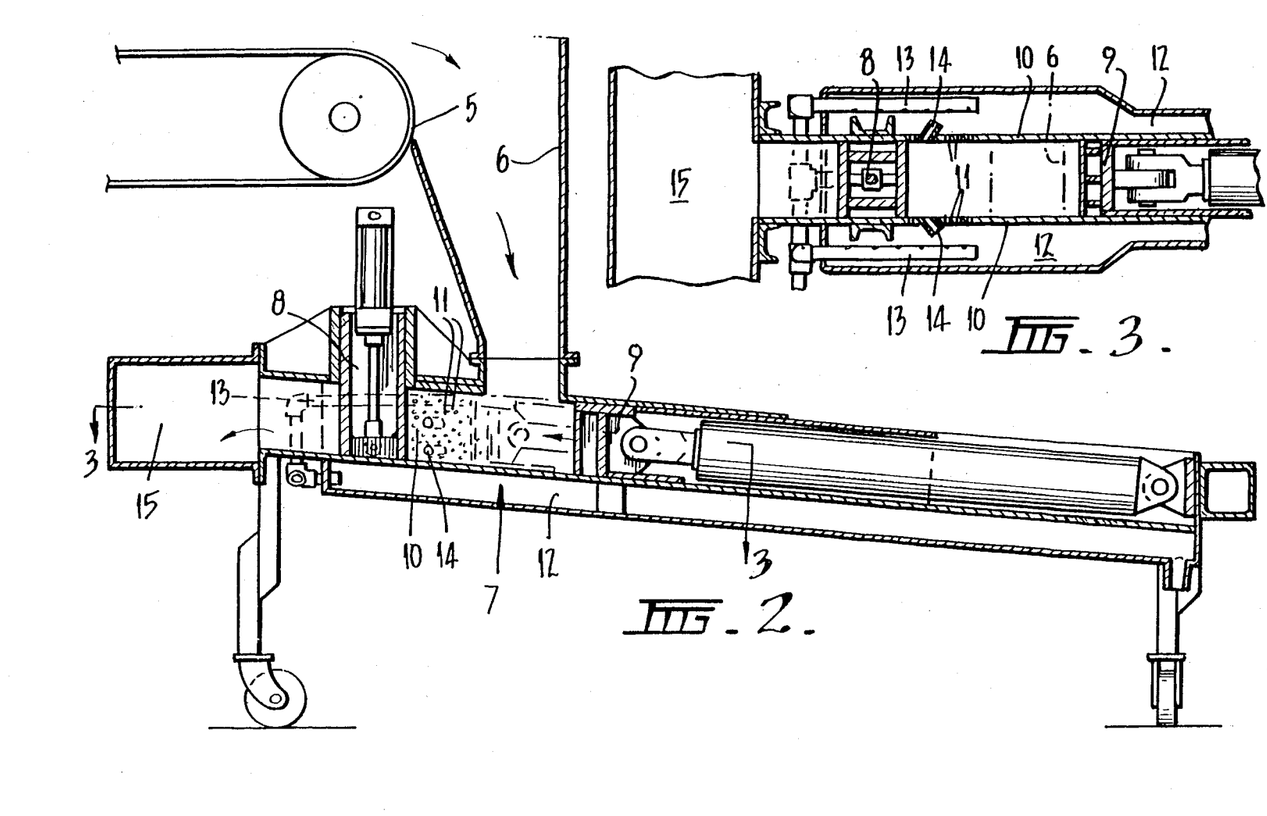
FIG. 2 is a sectional side view of the screenings conveyor and dewatering press taken along the line 2—2 of FIG. 1.
FIG. 3 is a sectional plan view of the dewatering press taken along the line 3—3 of FIG. 2.
Figure 4:
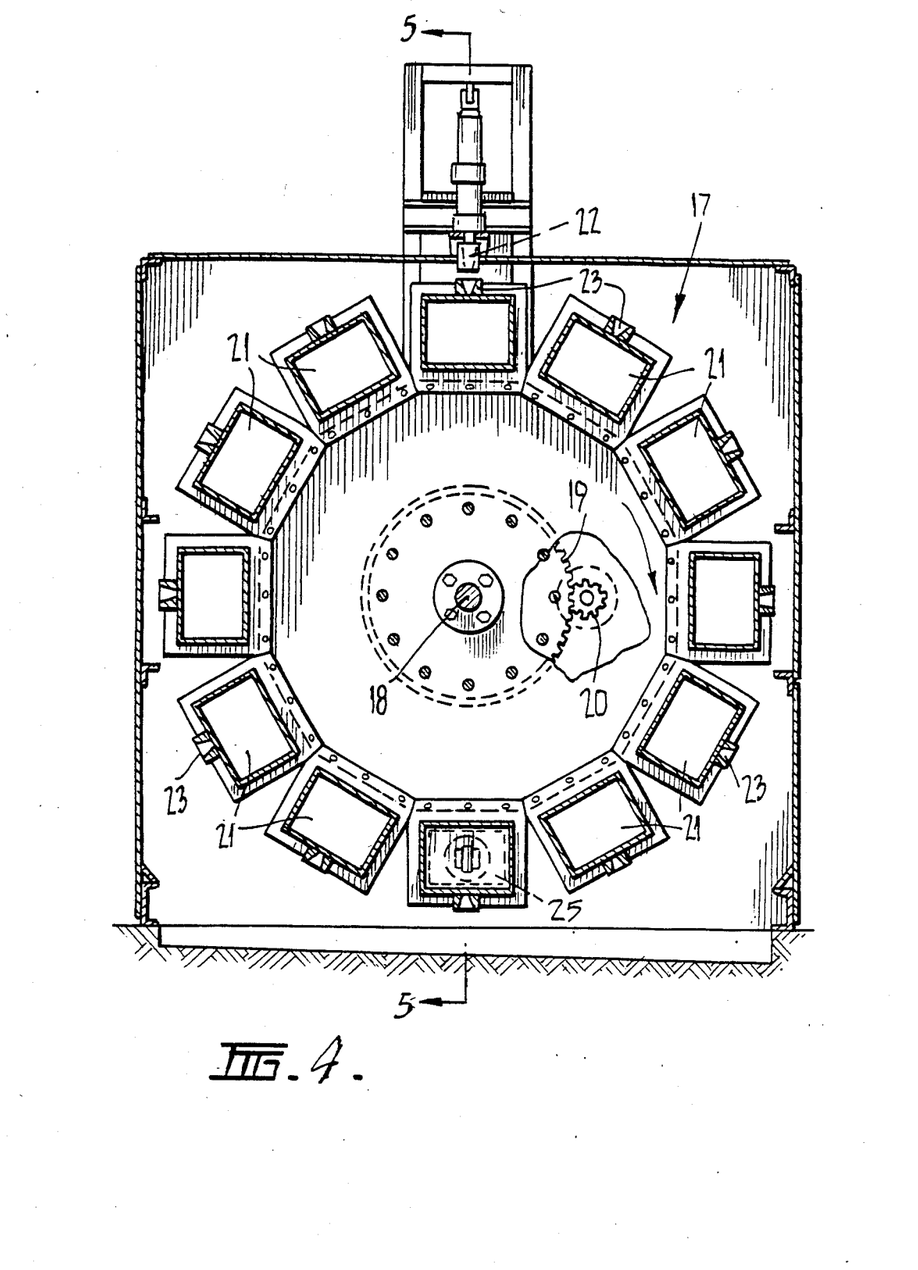
FIG. 4 is a sectional end view through the storage carousel taken along the line 4—4 of FIG. 1.
Figure 5:
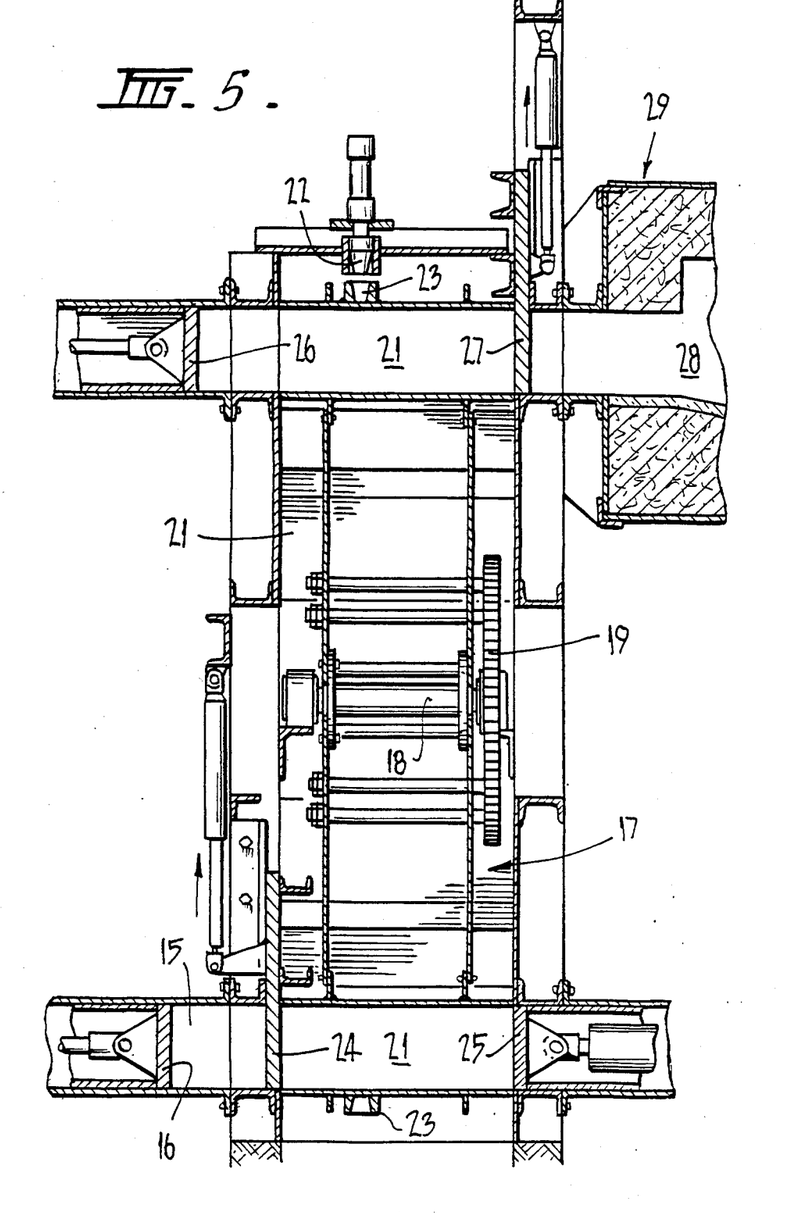
FIG. 5 is a sectional side view through the storage carousel taken along the line 5—5 of FIG. 4.
Figure 6:
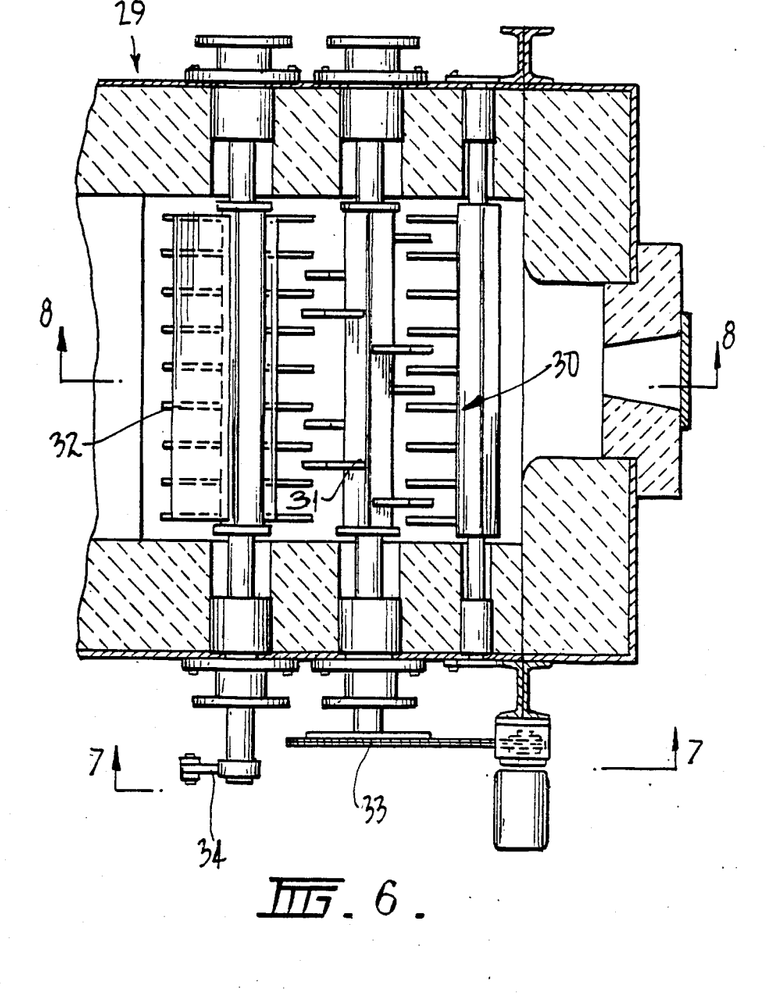
FIG. 6 is a plan view of the incinerator rocking grates taken along the line 6—6 of FIG. 1.
Figure 7:
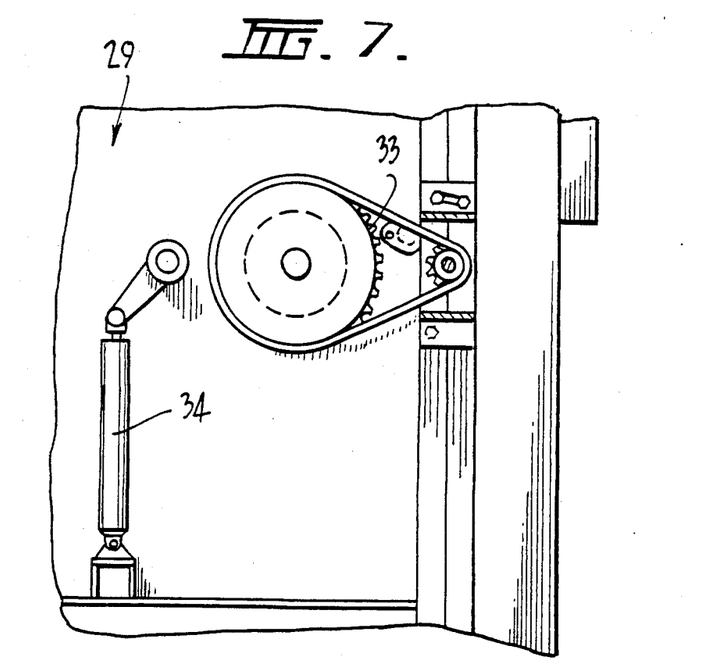
FIG. 7 is an end view of the grate operating mechanism taken along the line 7—7 of FIG. 6.
Figure 8:
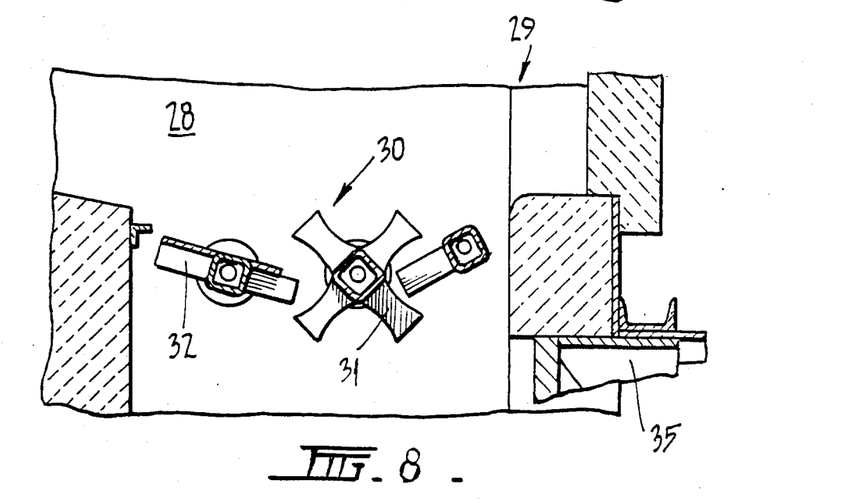
FIG. 8 is an end view of the rocking grates taken along the line 8—8 of FIG. 6.

Ram 9 is operated for a sufficient number of cycles until a wafer of pressed screenings of desired size is produced. Gate 8 is then raised and ram 9 is extended fully, pushing the wafer into a carousel loader chamber 15. Ram 9 then retracts fully, allowing pressure gate 8 to be returned to its lower operative position as shown in FIG. 2. Sprays 13 and 14 are not activated during loading of a wafer into carousel loader chamber 15.

When a sufficient number of wafers have been pushed into loader chamber 15 a carousel loader ram 16 partly extends pushing the group of wafers along loader chamber 15. This clears the area of loader chamber 15 directly in front of the dewatering press 7 ready for a further group of wafers to be pressed and moved into the loader chamber 15.

This further group and following groups of wafers are moved along loader chamber 15 by loader ram 16 until a slug of material comprising a number of groups of wafers is ready in chamber 15 for charging into a storage carousel 17. By providing the slugs of material in the form of a number of wafers, the material is more easily broken up for burning when eventually loaded into the incinerator.

Storage carousel 17 is rotatably mounted on shaft 18 and driven through gears 19 and 20. Equispaced circumferentially located storage compartments 21 are provided on carousel 17 and are adapted in turn to be brought into alignment with loader chamber 15 through an indexing mechanism connected to gear 20 and locked in position by hydraulically operated locking pin 22 engaging in a locking recess 23 on a compartment 21.

When locking pin 22 is engaged in recess 23, hydraulically operated carousel loading door 24 is lifted and loader ram 16 extends fully and pushes the slug of material into the aligned empty compartment 21. As ram 16 moves the material into the carousel compartment an oppositely located equalizer ram 25 is actuated and moves into the compartment so as to centralize the slug of material therein. The loader and equalizer rams then retract and door 24 is lowered to seal off the charged compartment 21.

Locking pin 22 is then released and the carousel 17 is rotated one pitch by the indexing mechanism to bring another empty compartment into alignment with loader chamber 15 and locked in that position. The compartments 21 are progressively charged and indexed until a full compartment is brought into alignment with an incinerator feeder ram 26 and locked in that position. Incinerator fire door 27 is then lifted and ram 26 is actuated to push the slug of material from the carousel compartment into the drying zone 28 of incinerator 29. Loading ram 26 then fully retracts and fire door 27 closes.

Incinerator 29 is of the multi-hearth storey type with a rocking type agitating grate system 30 incorporating a rotating grate 31 and a tilting grate 32. Rotating grate 31 is driven through gearing 33 and tilting grate 32 is actuated by a hydraulic ram mechanism 34.

Grates 31 and 32 are connected to control means initiated by a blockage in the grate system so that if rotating grate 31 does not prove rotation in one direction, it immediately reverses to rotate in the opposite direction and should rotation not be possible in that direction, tilt mechanism 34 is actuated to tilt grate 32 and grate 31 then rotates in said one direction endeavouring to clear the obstruction. If the obstruction is then cleared, grate 32 will return to its original position. If however the obstruction has not been cleared and the fault condition is not rectified by the operator, the system will automatically reset awaiting the next agitation period.

Reciprocating stoker rams 35 and 36 function to transfer and turbulate the screenings during the combustion process. A primary burner 37 is mounted in the lower hearth section over the entrance to ash conveyor 38, and a secondary burner, not shown, is fitted to the secondary combustion chamber located at the outlet from the drying section of the incinerator. A heat exchanger 39 may be provided around chimney stack 40 to provide preheated combustion air to the burners.

The plant of the present invention is virtually fully automatic under programmable logic control (P.L.C.) which can be overridden for manual control. It is not necessary in the operation of the plant for the supervising staff to touch the waste or the waste receptacles at any time.

The control system is so arranged as to sound an alarm should a malfunction occur and the starting and stopping function of the incinerator is automatically controlled by the number of full compartments in the storage carousel. The automatic control of storage and feeding eliminates both the cost of labour and the unpleasant task of handling this type of waste, particularly in hot weather.

OPERATION OF EMBODIMENT

As the screenings drop into the receiving section of the dewatering press, their level builds and ultimately activate the hopper level sensor. This initiates the pressing cycle, however, a separate remote press cycle start push button is provided to allow operators to override the automatic cycle start signal.

During its pressing cycle the dewatering press hydraulic ram pushes the screenings at high pressure against the hydraulically held pressure gate, removing approximately 50% of the water from the screenings. The pressure of the dewatering press can be varied to suit particular conditions. With the dewatering press moving in, a water wash solenoid is energised and allows flushing water to pass over the outside of the press dewatering area. When the dewatering press moves out an internal water spray solenoid valve is energized to cleanse the material being pressed. The two water solenoid valves operate alternately with the direction of the press ram.

A number of pressing cycles are counted by the P.L.C. and when the prescribed numbers are completed the vertical opening pressure gate lifts and the dewatering press ram extends fully pushing the wafer of pressed screenings into the empty carousel loader chamber. The dewatering press ram then retracts fully and allows the pressure gate to drop. During both of these strokes the respective water solenoid valves are not energized.

The number of wafers being pushed into the carousel loader chamber are counted by the P.L.C. and when the counter function is completed the carousel loader ram partly extends moving the group of wafers along the loader chamber. This allows the area directly in front of the dewatering press to be cleared ready for the next group of wafers to be moved into the carousel loader chamber area.

Again the carousel loader ram partly extends moving the group of wafers along the loader chamber. The number of operations is counted and when completed it signals that a slug of material comprising a number of groups or wafers is ready for charging into the carousel.

The process of loading the carousel is started by the P.L.C. first checking that the compartment before the bottom vertical centre position (5 o'clock) is in fact free of material. Then the carousel locking pin lifts up and the carousel rotates to bring the empty compartment in line with the carousel loader position. The locking pin then comes down and signals the carousel loading door to come up which in turn allows both the carousel loader and equaliser rams to move in. This action allows the slug of material to be pushed into the carousel compartment and be centralized. The carousel loader and equaliser ram then retract and when fully retracted the carousel door ram extends lowering the door.

The last process explained above is only one of the functions of the carousel and the other is to provide full compartments for loading into the incinerator for disposal. The incinerator operation can be initiated by either of two means. One is by the operator knowing that there is a number of compartments full but not sufficient to provide automatic incinerator start up, in which case a burn cycle start push button has been provided to override the second, which is the automatic carousel check function. The system has been programmed to automatically operate a carousel check four times each day and during any of these checks, should the required number of full compartments be counted then the incinerator will start up. A further automatic program feature is that after a certain number of time carousel checks have been performed, irrespective of the number of full compartments, then the incinerator will be started. A further overriding push button has been provided for an operator instigated carousel check but this check must count the required number of full compartments or otherwise the system sits idle until more full compartments are provided and the next carousel check is performed.

The incinerator cycle commences with the two burner units starting up and running for the duration of the preheat period. Once the secondary chamber is past the set point of the temperature controller, the preheat fan automatically starts up.

At the end of the preheat period the stoker rams fully extend to transfer waste material which has been sitting since the last incinerator cycle to the next zone of the incinerator. The ash conveyor also starts up and runs for a predetermined period to convey any burnt out material into a container or removal trailer.

Having cleared the various incinerator zones, the carousel system raises the lock pin and rotates the carousel at the same time scanning for a full compartment in the position immediately before the top vertical axis. This compartment is brought into line with the incinerator feeder position and then the locking pin comes down locating the carousel. This action signals the fire door to rise and the incinerator feeder fully extends pushing the slug of material out of the carousel compartment and into the incinerator drying zone. The incinerator feeder ram fully retracts and the fire door comes down to its closed position.

Operation of the stoker rams, agitator grates and ash conveyor are all controlled on time during the burn cycles. Further burning cycles and full compartment loading into the incinerator are timed and will continue until the "carousel compartments empty" signal indicates the system has no further material. At that time a burn out cycle is commenced during which operation of the burner, stokers and agitator system continue as for the burning period but at the end of this time period all equipment is shut down with exception of the burner fans and the preheat fan.

These three fans continue to run for the cooling cycle after which they will also shut down and the system will remain idle until the next command to start the incineration process.

The incinerator is a multi-hearth storey type with rocking type drying grates or agitators in the drying zone. Stoker rams have also been incorporated in the pyrolytic and combustion zones to transfer and turbulate the screenings during the combustion process. The final conveying of the ash out of the incinerator is by a screw type ash conveyor. The operation of the agitator, stokers and ash conveyor are all independently time controlled functions and provide a means of the material being further broken up at the outlet of the drying zone. The burning material is gradually moved and finally dropped into the final combustion area, where combustion is completed. The stoker ram at this level eventually moves the burnt material into the ash pit where it is removed into a container by the ash conveyor.

The primary burner provides the heat for combustion, drying etc. and is mounted over the entrance to the ash conveyor section so that maximum heat from the primary burner flame is given off in the lower hearth area.

A secondary burner is fitted to the secondary combustion chamber located at the outlet from the drying zone section of the primary chamber. The products of combustion from the primary chamber produce a combustible gas which is drawn by natural draught into the secondary chamber where the secondary burner raises the gas temperature to that required for complete burning. Whilst burning, the gases draw their own combustion air from the rows of holes along the inspirator section of the secondary chamber. With this action, the time and temperature parameters are adequate for maximum burnout of particulate matter, and elimination of odour to required levels.

Auxiliary combustion air for the primary and secondary chambers is provided by air being drawn from the carousel area and pushed by the pre-heat fan to a counter flow heat exchanger around the stack. The heated air produced is provided through adjustable flow controlled dampers to either around the primary burner and/or into the secondary chamber burner section.

The primary chamber is fitted with an inspection opening which is weighted and hinged to act as an explosion relief device.

The burners preferably are for automatic operation, with the primary unit to burn out and dry the waste product while the secondary burner is to ignite the products of combustion coming from this primary chamber. Both burner units are temperature controlled for efficient operation,

We claim:
1. A sewage screenings disposal system comprising:
    (a) dewatering press means for reducing the moisture content of raw screenings by pressing the raw screenngs into a compact slug;
    (b) a storage carousel for cooperation with the dewatering press means, the storage carousel having a plurality of storage compartments;
    (c) loader means for loading slugs of pressed screenings discharged from the dewatering press means into an empty carousel storage compartment of the storage carousel when the empty storage compartment is positioned at a carousel loader position;
    (d) an incinerator for cooperation with the storage carousel, the incinerator comprising combustion means to transform the slugs of pressed screenings into ash;
    (e) means to move said loaded carousel storage compartment from the carousel loader position to an incinerator feeder position spaced from the carousel loader position;
    (f) feeder means at the incinerator feeder position for feeding the slugs of pressed screenings from the loaded carousel storage compartment into the incinerator when the loaded carousel storage compartment is at the incinerator feeder position; and
    (g) means for removing the ash from the incinerator.
2. A system according to claim 1 wherein the dewatering press means includes a dewatering press having a press chamber, a press ram at one end thereof, a movable pressure gate at the other end thereof, and a feed hopper mounted on the press from which raw screenings are fed into the press, the dewatering press chamber being provided with apertured sides to allow removal of liquid from the screenings being pressed.
3. A system according to claim 2 wherein the pressure gate is movable out of the press chamber to allow a pressed wafer of screenings to be pushed out of the press chamber by the ram into a loader chamber of said loader means located at said other end of the press beyond the pressure gate.
4. A system according to claim 2 or claim 3 wherein water spray members are located around the press chamber for flushing water over the outside of said apertured sides, and further spray members are located on the said apertured sides for cleansing the pressed material in the press chamber.
5. A system according to claim 4 wherein the flushing sprays are activated when the ram is operated on a pressing cycle and the cleansing sprays are activated when the ram is moving out of the press chamber after a pressing cycle, both said sprays being non-operative when said pressure gate is moved to allow loading of a pressed wafer of screenings into the loader chamber.
6. A system according to claim 1 wherein said loader means includes a loader chamber for receiving wafers of pressed screenings from said dewatering press means, a carousel loader ram located in said loader chamber for pushing pressed wafers of screenings therealong and for charging a slug of pressed wafers into the said empty storage compartment carousel.
7. A system according to claim 6 wherein a carousel loading door is located at the end of the loader chamber adjacent the storage carousel at a lower location thereon and is operable, on location of the empty carousel storage compartment opposite said loader chamber, to open and allow the loader ram to charge said empty carousel storage compartment with a slug of wafers of pressed screenings and to thereafter close on retraction of said loader ram.

8. A system according to claim 1 wherein the storage carousel is mounted on a horizontal shaft rotatable in a supporting structure and driven through gear means, and said carousel storage compartments are axially open-ended, equispaced and circumferentially located in the storage carousel.

9. A system according to claim 1 wherein the incinerator is a multi-hearth storey type having primary and secondary combustion chambers, a rocking grate system located between said secondary combustion chamber and said primary combustion chamber and reciprocating stoker rams for transference and turbulation of the charged screenings during the combustion process, and said combustion means comprising primary and secondary burners respectively located in said primary and secondary combustion chambers.

10. A system according to claim 9 wherein said rocking grate system includes a rotating grate and a tilting grate, said grates being connected to control means adapted to be initiated by a blockage in the grate system to reverse the rotation of the rotating grate to clear the blockage.

11. A system according to claim 10 wherein said control means, on non-clearance of the blockage after initiating reverse rotation of the rotating grate, actuates the tilt grate to allow the rotating grate to rotate in said reverse direction, and when the obstruction is cleared the tilt grate is returned to its normal position.

12. A system according to claim 10 or claim 11, wherein said incinerator further includes an ash removal conveyor, and a chimney stack having a heat exchanger to provide preheated combustion air to the burners.

13. A sewage screenings disposal system comprising:
   (a) dewatering press means for reducing the moisture content of the raw screenings;
   (b) a storage carousel for cooperation with the dewatering press means, the storage carousel comprising equispaced circumferentially located axially open-ended storage compartments and being mounted on a horizontal shaft rotatable in a supporting structure and driven through gear means;
   (c) loader means for loading slugs of pressed screenings from the dewatering press means into the storage carousel;
   (d) an incinerator for cooperation with the storage carousel, the incinerator comprising combustion means to transform the slugs of pressed screenings into ash;
   (e) feeder means for feeding the slugs of pressed screenings from the storage carousel into the incinerator, said feeder means being located on the supporting structure and comprising a feeder ram operable to push a slug of pressed screenings from a loaded carousel compartment into the incinerator;
   (f) a movable fire door located at an upper location on the supporting structure between the supporting structure and the incinerator and opposite said feeder ram, said fire door being movable to an open position on actuation of said feeder ram to allow a slug of pressed screenings to be pushed into the incinerator, said fire door being movable to a closed position on retraction of said feeder ram; and
   (g) means for removing the resultant ash from the incinerator.

14. A system according to claim 13 wherein said supporting structure is provided with means engageable with the storage compartments to lock said storage carousel against rotation when the empty storage compartment is positioned in alignment with said loader means, said locking means being connected to said drive gear means through an indexing mechanism.

15. A system according to claim 8 or claim 14 wherein said feeder means are located on said supporting structure and comprise a feeder ram operable to push a slug of pressed screenings from the loaded carousel compartment into said incinerator.

16. A system according to claim 14 wherein said feeder ram and said fire door are operably connected through said locking means and said indexing mechanism so as to be actuable only when the storage carousel is locked at an indexed position with one of said storage carousel compartments aligned with said feeder ram and fire door.

17. A sewage screenings disposal system comprising, dewatering press means for reducing the moisture content of the raw screenings, a storage carousel for cooperating with the dewatering press means, loader means for loading slugs of pressed screenings from the dewatering press means into the storage carousel, an incinerator comprising combustion means to transform said slugs of pressed screenings into ash, feeder means for feeding the slugs of pressed screenings from the carousel into the incinerator, and means for removing the resultant ash from the incinerator, characterized in that:
   (a) the dewatering press means includes a dewatering press having a press chamber, a press ram at one end thereof, a movable pressure gate at the other end thereof, and a feed hopper mounted on the press from which raw screenings are fed into the press, the dewatering press chamber being provided with apertured sides to allow removal of liquid from the screenings being pressed;
   (b) said loader means includes a loader chamber for receiving wafers of pressed screenings from said dewatering press means, a carousel loader ram located in said loader chamber for pushing pressed wafers of screenings therealong and for charging a slug of said pressed wafers into the said storage carousel;
   (c) said storage carousel is provided with equispaced circumferentially located axially open-ended storage compartments, and is mounted on a horizontal shaft rotatable in a supporting structure and driven through gear means;
   (d) said feeder means are located on said supporting structure and comprise a feeder ram operable to push a slug of pressed screenings from a loaded carousel compartment into said incinerator; and
   (e) said incinerator is a multi-hearth storey type having a rocking grate system located between a secondary combustion chamber and a primary combustion chamber having primary and secondary burners, respectively, and including reciprocating stoker rams for transference and turbulation of the charged screenings during the combustion process.

18. A sewage screenings disposal system comprising:
   (a) dewatering press means for reducing the moisture content of the raw screenings;
   (b) a storage carousel for cooperation with the dewatering press means;

(c) loader means for loading slugs of pressed screenings from the dewatering press means into the storage carousel, said loader means including:
  (i) a loader chamber for receiving wafers of pressed screenings from said dewatering press means, a carousel loader ram located in said loader chamber for pushing pressed wafers of screenings therealong and for charging a slug of said pressed wafers into the storage carousel;
  (ii) a carousel loading door located at the end of the loader chamber adjacent the storage carousel at a lower section thereon and operable, on location of an empty storage carousel compartment opposite said loader chamber, to open and allow the loader ram to charge said empty carousel storage compartment with a slug of wafers of pressed screenings and thereafter to close on retraction of said loader ram; and
  (iii) an equalizing ram located on the other side of the storage carousel and in alignment with said loader ram and operable to enter said empty carousel compartment during charging thereof to ensure centralization of said loaded slug in said carousel compartment;
(d) an incinerator for cooperation with the storage carousel, which comprises combustion means, to transform the slugs of pressed screenings into ash;
(e) feeder means for feeding the slugs of pressed screenings from the carousel into the incinerator; and
(f) means for removing the resultant ash from the incinerator.

* * * * *